United States Patent
Law et al.

[19]

[11] Patent Number: 6,113,030
[45] Date of Patent: Sep. 5, 2000

[54] READILY CHANGEABLE ISOLATOR AND METHOD OF ASSEMBLY THEREOF

[75] Inventors: Thomas R. Law, Saegertown; Paul J. Snyder, Jr., Erie, both of Pa.

[73] Assignee: Lord Corporation, Cary, N.C.

[21] Appl. No.: 08/972,063

[22] Filed: Nov. 17, 1997

[51] Int. Cl.$^7$ .................................................. B64D 27/00
[52] U.S. Cl. ........................... 244/54; 248/556; 248/557; 248/560; 248/638
[58] Field of Search ............................. 244/54; 248/556, 248/557, 560, 638

[56] References Cited

U.S. PATENT DOCUMENTS

| | | | |
|---|---|---|---|
| 3,601,431 | 8/1971 | Henley | 287/104 |
| 4,514,458 | 4/1985 | Thorn et al. | 428/222 |
| 5,031,545 | 7/1991 | Bourgeot | 105/199.1 |
| 5,033,722 | 7/1991 | Lammers | 267/153 |
| 5,108,045 | 4/1992 | Law et al. | 241/54 |
| 5,397,112 | 3/1995 | Roth et al. | 267/140.12 |
| 5,397,113 | 3/1995 | Kojima et al. | 267/140.14 |
| 5,855,069 | 1/1999 | Matsubayashi et al. | 30/276 |
| 5,927,407 | 7/1999 | Gwinn et al. | 173/162.2 |

FOREIGN PATENT DOCUMENTS

| | | |
|---|---|---|
| 0 546 384 A1 | 11/1991 | European Pat. Off. . |
| 0 456 242 A1 | 6/1993 | European Pat. Off. . |
| 952779 | 12/1964 | United Kingdom . |
| WO 97/45650 | 12/1997 | WIPO . |

OTHER PUBLICATIONS

Lord Mechanical Products Publication entitled *Vibration, Shock, Noise Control Product Data—Safetied Tube Form Mounts* (*STA Series*) DS–73009; 1980.
Lord Mechanical Products Engineering Guide and Catalog for Vibration, Shock and Noise Control Products, PC2201n, pp. 75–80, Mar. 1996.

*Primary Examiner*—J. Woodrow Eldred
*Attorney, Agent, or Firm*—Randall S. Wayland; Wayne W. Rupert; James W. Wright

[57] ABSTRACT

An isolator (26) and assembly method therefor. The isolator (26) is particularly useful for aircraft thrust reverser doors, and the like, and includes an outer member (28), and a isolator component (29). The outer member (28) has a central axis (A—A), a generally non-planar inner peripheral surface (32), and first and second axially extending slotted entryways (48, 48'). The isolator component (29) preferably includes a component axis (B—B), an inner member (30) having an external radial peripheral surface (33), and an elastomer or metal mesh member (40) surrounding said external radial peripheral surface (33). The isolator component (29) is assembled and retained within said outer member (28) by insertion endwise through said first and second slotted entryways (48, 48'), and rotating 90° such that the component axis (B—B) is substantially aligned with the central axis (A—A).

26 Claims, 4 Drawing Sheets

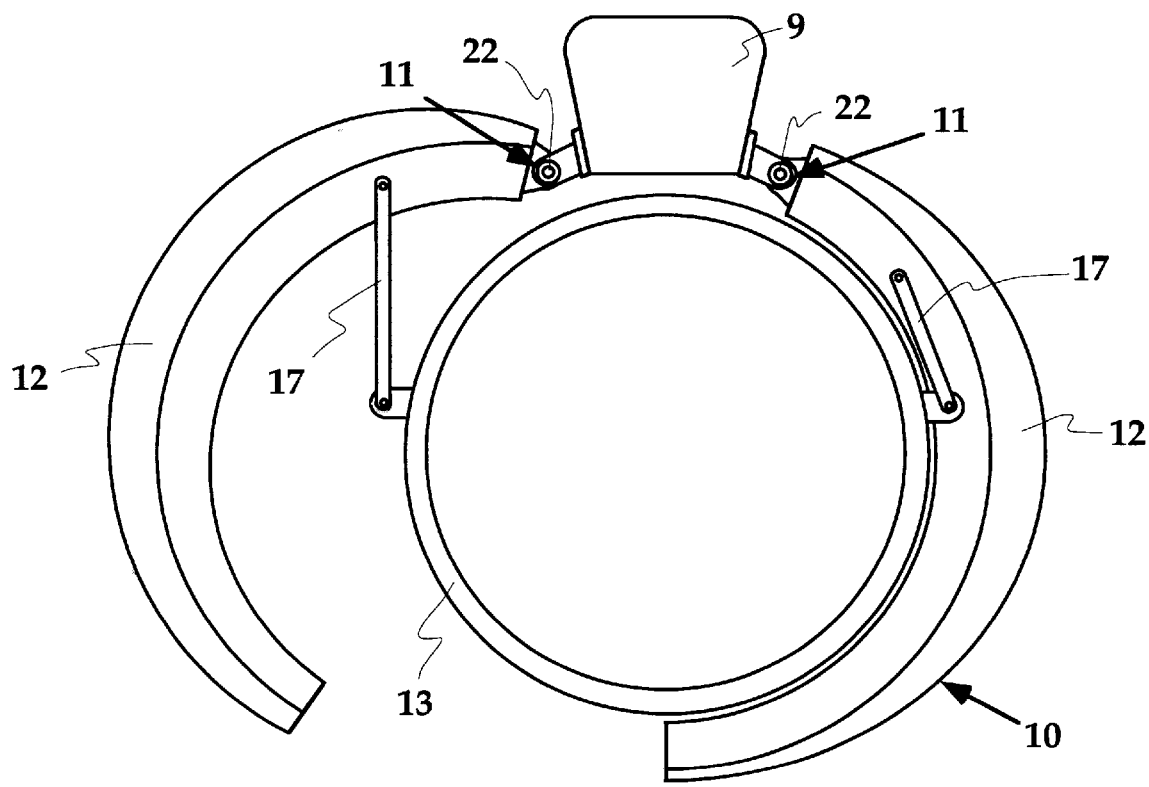
Fig. 1f Prior Art
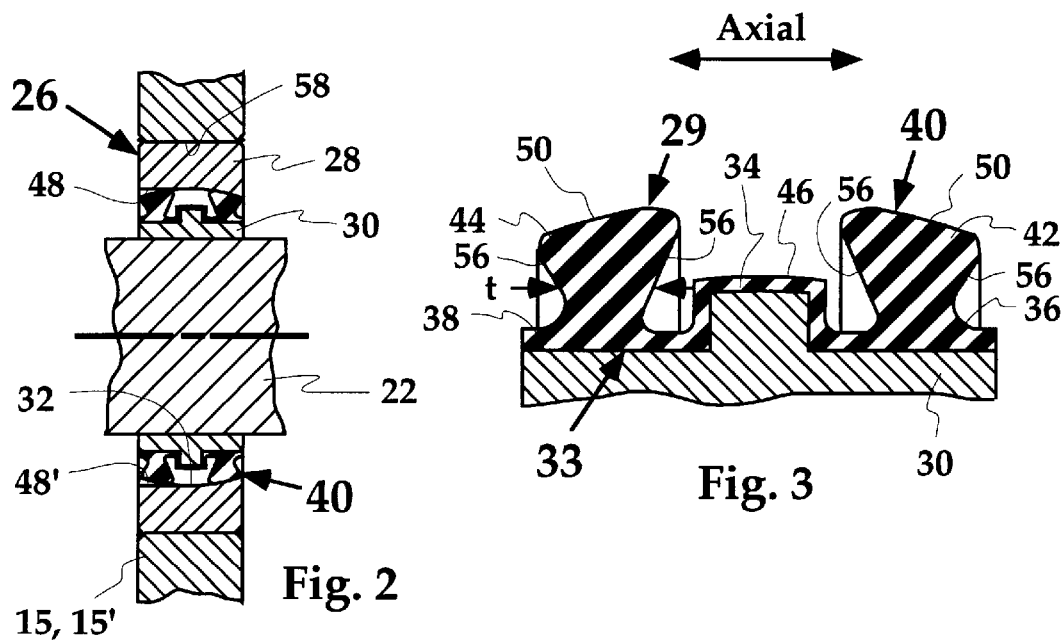
Fig. 2
Fig. 3

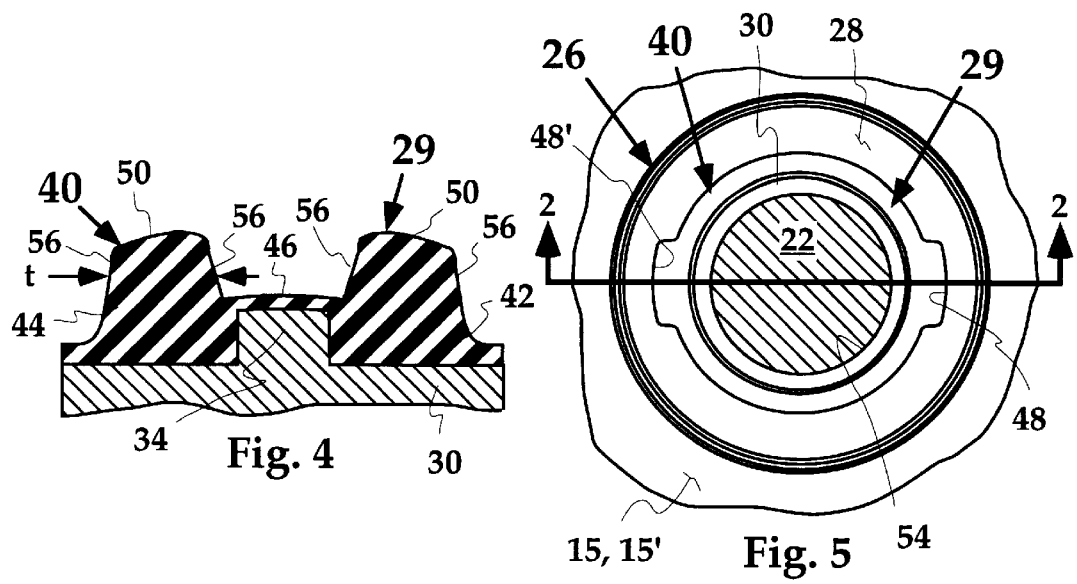
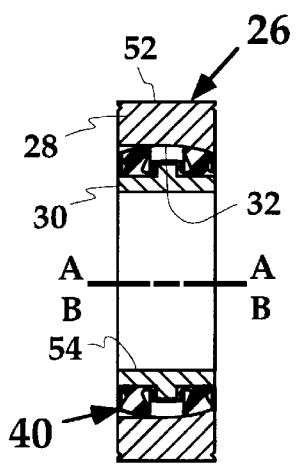
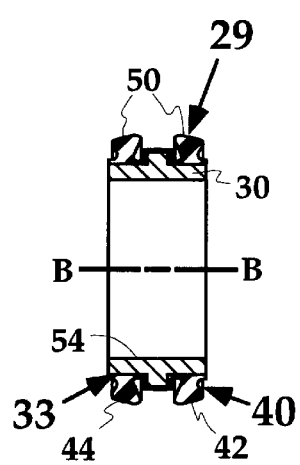
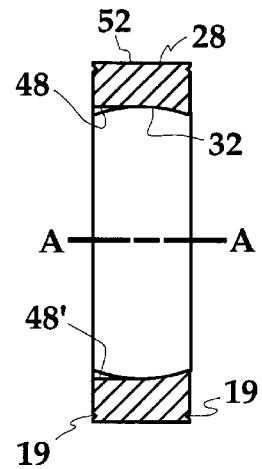
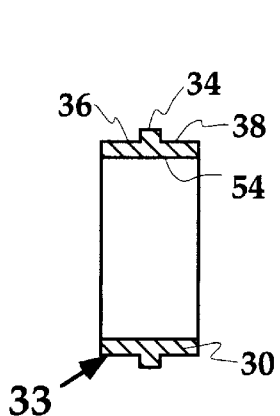
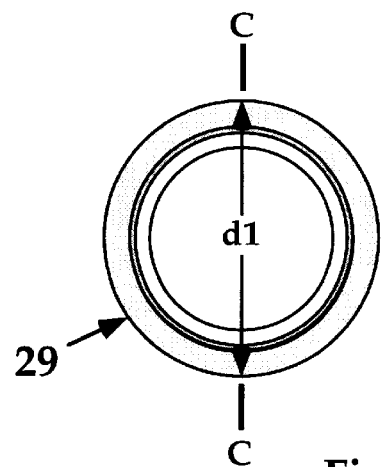

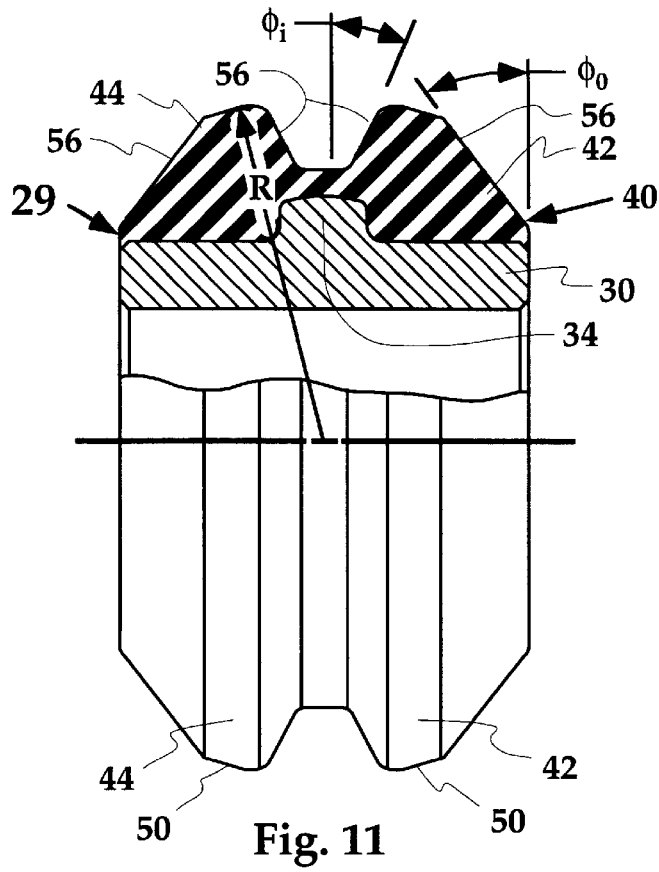
Fig. 11
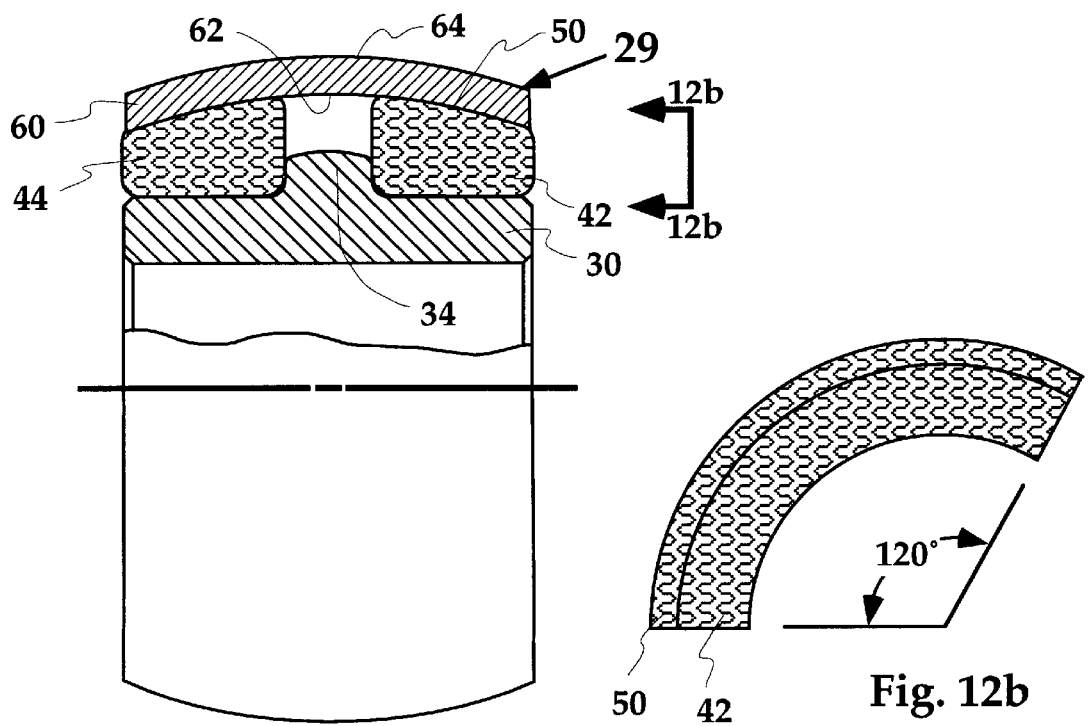
Fig. 12a
Fig. 12b

READILY CHANGEABLE ISOLATOR AND METHOD OF ASSEMBLY THEREOF

FIELD OF THE INVENTION

This invention relates to the area of support mountings. More specifically, it relates to isolators.

BACKGROUND OF THE INVENTION

In many applications tubeform-type isolators are used to carry load, accommodate motion, and isolate vibrations between relatively moving structures. One demanding application for such isolators is for isolation of the thrust reverser doors 12 on an aircraft engine 10, as shown in FIGS. 1a and 1f. Heretofore, elastomeric tubeform isolators 11, such as the one shown in partial cross section in FIG. 1e have been utilized. A pylon structure 9 shown in FIGS. 1a and 1b supports the weight of the engine 10 and interconnects the engine 10 to the wing or other structure (not shown). Attached to pylon 9 are various brackets 15, 15' (See enlarged FIGS. 1c and 1d) which have the tubeform isolators 11 secured within their ends. The isolators 11 function to prevent a hard structural transmission path which would enable vibration from the engine to be transmitted from the thrust reverser door 12 into the pylon 9. Further, isolators 11 accommodate axial and radial motions resulting from static and transient engine movements relative to the pylon. It should be understood that the engine 10 is suspended relative to the pylon structure 9 by flexible engine mounts (not shown). Therefore, some radial and/or axial movement of the engine 10 will occur due to transient loads.

The prior art elastomeric thrust reverser isolator 11 is best seen in FIG. 1e and includes a cylindrical inner member 14 having a throughbore through which a thrust reverser door pin 22 is closely received, and a tubular outer member 16 which is received in a bore formed in pylon bracket 15, 15'. Annular elastomer 18 is bonded to both the outer member 16 and inner member 14 and provides flexibility for motion accommodation and isolation. Preferably, a V-groove 19 or the like is staked over to secure isolator 11 in the bore formed in pylon bracket 15, 15'.

Although, the tubeform isolators 11 are adequate for some applications, the thrust reverser door application is very demanding because of high load and motion conditions encountered. For example, during maintenance of the engine 10, the thrust reverser door(s) 12 may be opened by pivoting about the thrust reverser hinge pin(s) 22 as shown in FIG. 1f. Hydraulic jacks 17 provide the lift force needed between the engine casing 13 and the thrust reverser door 12 to allow pivoting about hinge pins 22. During maintenance, significant static radial, torsional, and cocking loads are applied to the isolators 11 due to static loads and torsional and cocking moments resulting from the door weight and pivoting. Over time, this, as well as normal wear and tear on the isolators, severely stresses the elastomer and bond leading to a condition where replacement of the elastomeric isolator 11 is warranted. Further, once staked into the pylon bracket 15, 15', removal/changeout of the isolator 11 is a difficult and time consuming operation. Therefore, there is a long felt and unmet need for an isolator, such as for the thrust reverser isolator application, with improved ability to be quickly changed out, and/or which exhibits improved life as compared to the prior art tubeform isolators.

SUMMARY OF THE INVENTION

In light of the advantages and drawbacks of the prior art, the present invention is an isolator, comprising an outer member including a central axis (A—A), a generally non-planar (preferably spherical) inner peripheral retaining surface, and first and second axially extending slotted entryways, and an isolator component having a component axis (B—B). The isolator component is assembled and retained within said outer member by inserting endwise through the slotted entryways, and rotating the isolator component such that the component axis (B—B) is aligned with the central axis (A—A). Preferably, the isolator component includes an inner member having an external radial peripheral surface. An elastomer member is preferably bonded to the external radial peripheral surface. Optionally, the isolator component may include a metal mesh isolator member surrounding the inner member. Preferably also, the isolator includes a protruding snubber (preferably centrally located and annular shaped) for delimiting radial motion, thus protecting the flexible isolator member within the isolator component from being overstressed.

In accordance with another aspect of the invention, spaced first and second spring sections, which preferably comprise generally annular-shaped rings, are located adjacent to, surround, and are preferably bonded to the ends of the inner member. Preferably, the isolator component includes a profile formed on a radially outward surface thereof which is complimentary to the profile formed on the outer member's inner peripheral retaining surface. In another aspect, the thickness of the isolator member gradually varies from a point adjacent to said inner member to the radially outward periphery of the isolator member, or includes one or more tapered sidewalls, which may be tapered at differing angles.

One particularly advantageous use for the isolator of the present invention is for isolating a thrust reverser door, wherein a cylindrical outer surface of the outer member is being received in a pylon bracket interconnected to an aircraft pylon, and an axial throughbore of the inner member receives a pin interconnected to a thrust reverser door of an aircraft engine.

In another aspect of the invention, is provided a method of assembly of an isolator comprising the steps of: providing an outer member having a central axis (A—A), entryway slots, and an inner peripheral retaining surface having an inner radial dimension (d2), inserting an isolator component having a component axis (B—B) endwise through said entryway slots until a location of a largest radial outer dimension (d1) of said isolator component is positioned substantially adjacent to a location of the maximum inner radial dimension (d2) of the outer member, and rotating the isolator component about an axis aligned with the entryway slots until the component axis (B—B) is substantially aligned with the central axis (A—A).

It is an advantage of one aspect of the present invention that the present invention provides for easy changeout of the isolator component.

It is an advantage of another aspect of the present invention that the present invention eliminates damaging tension stresses in the isolator component.

It is an advantage of another aspect of the present invention that it eliminates damaging compression stresses in the isolator component due to radial loading by including central snubbing.

It is another advantage of the present invention that it eliminates the need to interchange the outer members secured into various structures, such as pylon brackets in thrust reverser door installations.

It is another advantage of the isolator in accordance with the present invention that it minimizes torsional strains in the isolator component, for example when the thrust reverser door is opened.

The abovementioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention. In the drawings, FIG. 1f illustrates a forward looking view of a jet engine illustrating the thrust reverser door hinged open, FIG. 2 illustrates a cross-sectional view of a first embodiment of isolator in accordance with the present invention installed in a pylon bracket, FIG. 3 illustrates an enlarged partial cross-sectional view of a portion of the isolator component of FIG. 2, FIG. 4 illustrates an enlarged partial cross-sectional view of a portion of a second embodiment of isolator component in accordance with the present invention, FIG. 5 illustrates a frontal view of the isolator including the isolator component of FIG. 2, 3, or 11 installed in a pylon bracket, FIG. 6 illustrates a cross-sectional side view of the elastomer isolator of FIG. 2, FIG. 7 illustrates a cross-sectional side view of the isolator component of FIG. 2, FIG. 8 illustrates a cross-sectional side view of the outer member of FIG. 2, FIG. 9 illustrates a cross-sectional side view of the inner member of FIG. 2, FIG. 10 illustrates a side view of the insertion of the isolator component in an endwise orientation through the entryway slots and into the outer member, FIG. 11 illustrates a partially cross-sectioned side view of the preferred embodiment of isolator component in accordance with the present invention, FIG. 12a illustrates a partially cross-sectioned side view of an embodiment of metal mesh isolator component, and FIG. 12b illustrates a end view of one of six metal mesh segments utilized FIG. 12a.

DETAILED DESCRIPTION OF THE PREFERRED EMBODIMENT

Figure 1A:
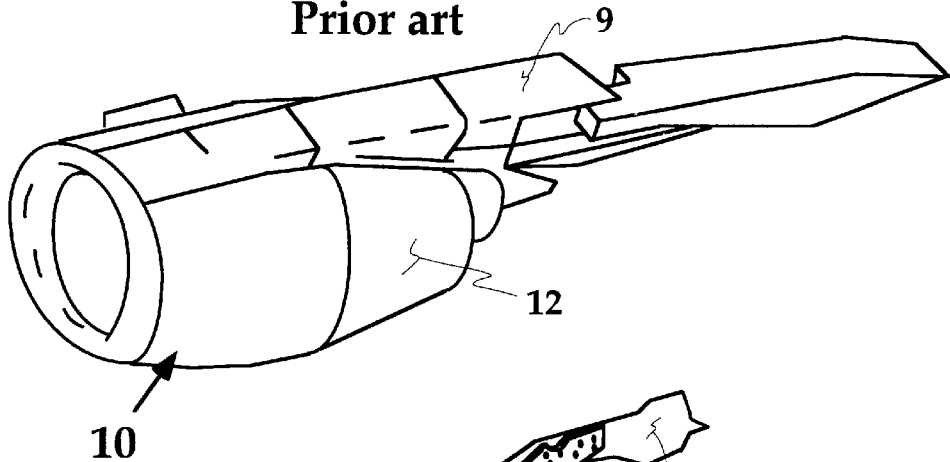
FIG. 1a illustrates a perspective view of an aircraft engine where an isolator in accordance with the present invention finds utility.

Referring now to the Drawings where like numerals denote like elements, in FIGS. 2, 5 and 6, shown generally at 26, is a first embodiment of the present invention isolator. This isolator 26 includes an outer member 28 (FIG. 8) and an isolator component 29 (FIGS. 3, 4, 7, 11) which is preferably comprised of an elastomer member 40 bonded to an inner member 30 and which is slidably received within a non-planar inner peripheral retaining surface 32 of the outer member 28. Optionally, the isolator component 29 may include metal mesh (FIG. 12a)

Figure 1B:
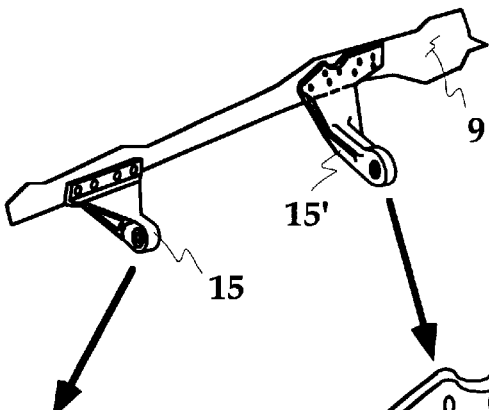
FIG. 1b illustrates a perspective view of a portion of the aircraft pylon where an isolator in accordance with the present invention is located.
Figure 1C:
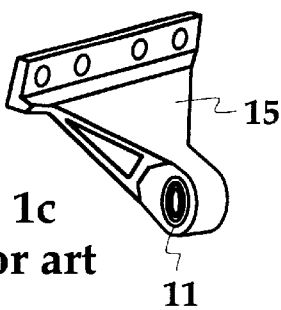
FIG. 1c and 1d illustrate perspective views of pylon brackets into which an isolator in accordance with the present invention may be assembled.
Figure 1D:
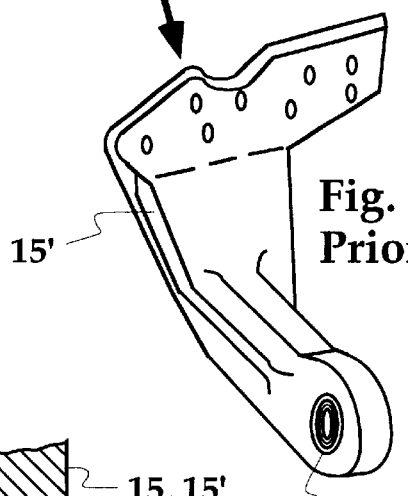

The preferably metallic outer member 28 as best seen in FIG. 8 includes a central axis A—A, a generally non-planar spherical inner peripheral retaining surface 32, and first and second aligned and axially-extending slotted entryways 48, 48'. The slotted entryways 48, 48' traverse axially and are formed deep enough such that they tangentially intersect the generally nonplanar inner peripheral retaining surface 32 (which is most preferably spherically shaped). Preferably also, the slotted entryways 48, 48' and are only located on one side of the outer member 28. In the thrust reverser application, the outer diametrical surface 52 of outer member 28 is received in the bore 58 of bracket 15, 15' and outermost portions of the V-grooves 19 (FIG. 8) are used to stake, and thus, secure the outer member 28 into the bores 58 formed in pylon brackets 15, 15' (FIGS. 1c, 1d) in the same manner as in the prior art.

The isolator component 29 preferably includes a component axis B—B (see FIG. 7), an inner member 30 and an isolator member 40, which in this embodiment is elastomeric. The inner member 30 as best seen in FIG. 9 includes an external radial peripheral surface 33 further including first and second cylindrical surfaces 36, 38 formed on the ends thereof, a centrally located preferably annular protruding snubber 34, and an axial throughbore 54.

The various isolating members 40 as best seen in FIGS. 3, 4 and 11 include elastomer, such as natural, synthetic rubber, blends thereof, or the like, the elastomer being preferably bonded to the external radial peripheral surface 33 of inner member 30. Preferably, the isolator members 40 include spaced generally annular-shaped first 42 and second 44 spring sections surrounding and preferably bonded to the outer peripheral surface 33. More particularly, elastomer first 42 and second 44 spring sections are preferably bonded to first 36 and second 38 cylindrical outer surfaces (FIG. 9). First 42 and second 44 spring sections resemble rings surrounding the ends of the inner member 30 and have shape factors (height to width ratio) of about 1:1. By way of example, and not to be considered limiting, the isolator 26 includes an axial static stiffness of about 800 lb./in. (143,967 N/m) or less and a radial static stiffness of about 2,300 lb./in. (402,790 N/m) or less. Preferably also, the snubber 34 snubs at about 0.07 in. (0.00178 m) radial deflection.

In the embodiments shown in FIGS. 3, 4, and 11, the flexible isolator member 40 includes first 42 and second 44 spring sections, each preferably including a generally spherical profile formed on radially outward surfaces 50 thereof. Preferably, the shape of the spherical profile is complementary to the spherical profile formed on the inner retaining surface 32 of the outer member 28 (FIG. 8). However, it should be understood that any non-planar profile may be implemented on the outer member 28 and isolator member 40, provided axial retention is achieved and that rotation of the isolator component 29 during installation is enabled. The first 42 and second 44 spring sections preferably each have a thickness t which gradually varies from a point adjacent to the inner member 30 to a point adjacent to the radially outward peripheral surface 50.

In the enlarged FIG. 3 embodiment, one or more of the sidewalls 56 taper outwardly, while in enlarged FIGS. 4 and 11 embodiments, sidewalls 56 taper inwardly. As shown in FIGS. 3, 4, and 11, preferably, the first 42 and second 44 spring sections are spaced on opposite sides of the snubber 34. The preferably annular snubber 34 delimits radial motion. Preferably, the snubber 34 includes a elastomer covering 46 for preventing metal-to-metal contact between the snubber 34 and the outer member 28. The snubber 34 functions to prevent large strains from being imparted to the isolator member 40 under radial loading, thus extending its useful life. The present invention offers further performance enhancement in that the isolator member 40 is unbonded to the outer member 28. In this way, large radial loads do not cause the elastomer 40 to be stressed in tension as with the prior art tubeform isolators. Further, rotational stresses in the isolator member 40 when the doors 12 are pivoted are minimized, because the isolator component 29 is free to rotate relative to the retaining surface 32 of outer member 28.

In accordance with another aspect of the invention, and as shown in FIG. 10, is provided a method of assembly of the isolator 26. The method of assembly comprises the steps of: inserting the isolator component 29 endwise (as shown by arrows) along the central axis A—A and through the first and second slotted entryways 48, 48' until a location of a maximum dimension d1 of the isolator component 29 is substantially aligned with the location of the maximum dimension d2 of the non-planar inner peripheral retaining surface 32 of the outer member 28, and then rotating the isolator component 29 90° about its C—C axis (aligned with the slots 48, 48'), such that the component axis B—B of component 29 is substantially aligned with the central axis A—A of the outer member 28 (as shown in FIG. 6). The outer member 28 having a preferably cylindrically shaped outer surface 52 may be inserted into a bore 58 (FIG. 2) formed in a bracket 15, 15', and the outer member 28 may be secured to the bracket 15, 15' by way of staking v-grooves 19 or the like. This step may be performed either prior to, or subsequent to, the earlier-mentioned steps. This method, in accordance with the present invention, ensures the isolator component 29 is assembled and retained within the outer member 28. The isolator member 40 is preferably slightly precompressed when installed within the generally non-planar inner peripheral retaining surface 32. Notably, once the outer member 28 is secured in the structure (Ex. pylon bracket 15, 15'), advantageously, it need not be removed again. The isolator component 29 can simply be changed out.

Figure 1E:
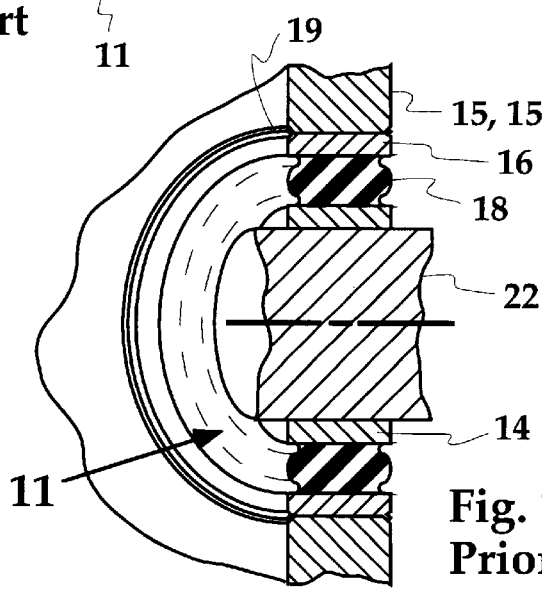
FIG. 1e illustrates a cross-sectional perspective view of a prior art elastomeric tubeform isolator.

In another aspect of the invention, the isolator 26 is useful for isolating a thrust reverser door 12 from a pylon structure 9. The outer member 28 of isolator 26 includes a cylindrical outer surface 52 (FIGS. 6, 8) which is received in a bore 58 formed in a pylon bracket 15, 15' (FIG. 5) interconnected to an aircraft pylon 9 (FIG. 1b) and replaces the prior art isolator 11 illustrated in FIG. 1e. The inner member 30 includes an axial throughbore 54 which receives a thrust reverser door hinge pin 22 interconnected to the thrust reverser door 12 (FIG. 1f) of the aircraft engine 10.

A preferred embodiment of the isolator component 29 of the isolator which finds a preferred application in the thrust reverser door assembly shown in FIG. 11. The isolator component 29 is similar to that shown in FIG. 3 in that it includes an inner member 30, an elastomer member 40 surrounding and preferably bonded to the inner member 30, and a centrally-located annular snubber 34 protruding from the inner member 30. The isolator member 40 includes first 42 and second 44 spring sections each having a spherical profile (having a radius R) formed on a radially outward peripheries 50. The sidewalls 56 of the springs 42,44 are tapered inwardly. The inventors have determined that an outer angle $\phi_o$ of about 38° and an inner angle $\phi_i$ of about 27° is most desirable and provides elastomer springs 42, 44 which bulge predominantly outwardly. The angles used are exemplary, but it is desirable to have an angle $\phi_o$ which is larger that the inner angle $\phi_i$. The isolator component 29 is received in an endwise orientation in the outer member 28 as shown in FIG. 4 and then rotated 90° into place. Alternatively, the isolator member 40 may be unbonded to the inner member 30 in some instances.

FIG. 12a illustrates an embodiment of isolator component 29 including an inner member 30, a snubber 34, and first and second springs 42, 44 comprising the isolator member 40. The springs 42, 44 are manufactured from a metal mesh material, such as taught in commonly assigned U.S. Pat. No. 4,514,458 to Thorn et al. entitled "Spring-Like Material Formed Of Compressed Metallic Wire". Metal mesh is desirable where temperatures are elevated. Preferably, the springs 42, 44 would be formed in arcuate segments each extending about 120° around the inner member 30 as shown in FIG. 12b, six being included in each isolator. A thin shim 60 including a non-planar preferably spherical inner 62 and outer 64 profiles provides the precompression, if needed, for the isolator member 40. The isolator component 29 is then inserted in the entryway slots 48 formed in the outer member as shown in FIG. 10. The outer radial dimensions and profile of the outer spherical surface 64 would appropriately sized to provide a very close fit in the inner profiled retention surface 32 of outer member 28 (FIG. 8). Spring members 42, 44 are installed between the inner member 30 and thin shim 60 by an operation where the springs 42, 44 are forced axially through a funnel to radially compress them. The springs then reexpand into the retaining space once inserted, i.e., to contact profiled surface 62.

In summary, it should be apparent from the foregoing that the present invention comprises a novel isolator and method of assembly including a outer member having an inner non-planar profiled surface and first and second entryways, and an flexible isolator component received endwise through the entryways and then rotated into place.

While several embodiments including the preferred embodiment of the present invention have been described in detail, various modifications, alterations, changes, and adaptations to the aforementioned may be made without departing from the scope of the present invention defined in the appended claims. It is intended that all such modifications, alterations, and changes be considered part of the present invention.

What is claimed is:

1. An isolator, comprising:
   (a) an outer member including a central axis (A—A), a non-planar inner peripheral retaining surface, and first and second axially extending slotted entryways, and
   (b) a flexible isolator component including a component axis (B—B) being assembled and retained within said outer member by insertion endwise through said slotted entryways, and rotating such that said component axis (B—B) is aligned with said central axis (A—A).

2. An isolator of claim 1 wherein said non-planar inner peripheral retaining surface includes a spherical surface.

3. An isolator of claim 1 further comprising an inner member including a protruding snubber.

4. An isolator of claim 3 wherein said snubber is centrally located on said inner member and is annular shaped.

5. An isolator of claim 1 wherein said flexible isolator component includes a spherical profile formed on a radially outward surface.

6. An isolator of claim 1 wherein said isolator component further includes an inner member having an external radial peripheral surface.

7. An isolator of claim 6 including a metal mesh member surrounding said external radial peripheral surface.

8. An isolator of claim 6 including an elastomer member surrounding said external radial peripheral surface.

9. An isolator of claim 6 including spaced first and second spring sections.

10. An isolator of claim 9 including a protruding snubber having a covering of elastomer.

11. An isolator of claim 9 wherein said first and second spring sections are bonded to said external radial peripheral surface.

12. An isolator of claim 9 wherein said first and second spring sections are generally annular-shaped rings surrounding ends of said inner member.

13. An isolator of claim 12 wherein said first and second spring sections each including spherical profiles formed on radially outward surfaces thereof.

14. An isolator of claim 12 wherein said first and second spring sections which are generally annular shaped rings having thicknesses which gradually vary from a point adjacent to said inner member to a point adjacent to a radially outward periphery of said first and second spring sections.

15. An isolator of claim 12 wherein at least one of said first and second spring sections includes a tapered sidewall.

16. An isolator of claim 12 wherein both said first and second spring sections include first and second tapered sidewalls.

17. An isolator of claim 12 including inwardly tapering sidewalls.

18. An isolator of claim 1 wherein said first and second axial extending slotted entryways are tangential to said non-planar inner peripheral retaining surface.

19. An isolator of claim 1 wherein said first and second axial extending slotted entryways are only located on one side of said outer member.

20. An isolator claim 1 for isolating a thrust reverser door further including an outer member having a cylindrical outer surface, an inner member having an axial throughbore, said cylindrical outer surface being received in a bracket interconnected to an aircraft pylon, and said axial throughbore receiving a pin interconnected to a thrust reverser door of an aircraft engine.

21. An isolator, comprising:
(a) an outer member including a central axis (A—A), a generally nonplanar inner peripheral retaining surface, and first and second axially extending slotted entryways formed therein,
(b) an elastomeric component having a component axis, including:
  i) an inner member having an external radial peripheral surfaces, a centrally located snubber, and an axial throughbore, and
  ii) an elastomer member including first and second spring sections surrounding said external radial peripheral surfaces of said inner member
whereby said elastomeric component is retained within said outer member by insertion endwise through said slotted entryways, and rotating such that said component axis is generally aligned with said central axis (A—A).

22. An isolator, comprising:
(a) an outer member including a central axis (A—A), a generally nonplanar inner peripheral retaining surface, and first and second axially extending slotted entryways,
(b) a metal mesh isolator component having a component axis (B—B), including:
  i) an inner member having an external radial peripheral surface, and an axial throughbore, and
  ii) a metal mesh spring surrounding said external radial peripheral surface of said inner member
whereby said metal mesh isolator component is retained within said outer member by insertion endwise through said slotted entryways, and rotating such that said component axis is generally aligned with said central axis (A—A).

23. A thrust reverser isolator, comprising:
(a) an outer member adapted for being received in a bore of a pylon bracket, said outer member including a central axis (A—A), a cylindrical outer surface, a generally spherical inner peripheral surface, and first and second axially extending slotted entryways,
(b) a elastomeric component having a component axis (B—B), including:
  i) an inner member having external radial peripheral surfaces, and a centrally located annular snubber, and an axial throughbore adapted to receive a thrust reverser door pin, and
  ii) an elastomer member including first and second spring sections surrounding said external radial peripheral surfaces said spring sections including generally spherical radially outward surfaces and at least one tapered sidewall,
whereby said elastomeric component is retained within said outer member by insertion endwise through said slotted entryways, and rotating such that said component axis (B—B) is generally aligned with said central axis (A—A).

24. A method of assembly of an isolator, comprising the steps of:
(a) providing an outer member having a central axis (A—A), entryway slots, and an inner peripheral retaining surface having an inner radial dimension,
(b) inserting an isolator component endwise through said entryway slots until a location of a largest radial outer dimension of said isolator component is positioned adjacent to a location of said maximum inner radial dimension of said outer member, and
(c) rotating said isolator component about an axis aligned with said entryway slots until a component axis (B—B) is substantially aligned with a central axis (A—A) of said outer member.

25. A method of claim 24 further comprising the steps of:
(a) inserting said outer member into a bore formed in a structure either prior to or subsequent to the previous steps, and
(b) securing said outer member to said structure.

26. A method of claim 25 further comprising the step of:
(a) inserting a pin through a throughbore formed in an inner member included within said isolator component.

* * * * *